(12) United States Patent
Samra et al.

(10) Patent No.: US 7,398,372 B2
(45) Date of Patent: Jul. 8, 2008

(54) FUSING LOAD AND ALU OPERATIONS

(75) Inventors: Nicholas G. Samra, Austin, TX (US);
Stephan J. Jourdan, Portland, OR (US);
David J. Sager, Portland, OR (US);
Glenn J. Hinton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1062 days.

(21) Appl. No.: 10/180,391

(22) Filed: Jun. 25, 2002

(65) Prior Publication Data

US 2003/0236966 A1  Dec. 25, 2003

(51) Int. Cl.
*G06F 9/30* (2006.01)
*G06F 9/40* (2006.01)
*G06F 15/00* (2006.01)

(52) U.S. Cl. .................. 712/209; 712/243; 712/244; 712/211; 712/24

(58) Field of Classification Search .............. 712/209, 712/243, 244, 211, 24, 210, 212
See application file for complete search history.

(56) References Cited

U.S. PATENT DOCUMENTS

| | | | |
|---|---|---|---|
| 4,858,105 A | 8/1989 | Kuriyama et al. | |
| 5,475,824 A | 12/1995 | Grochowski et al. | |
| 5,524,263 A * | 6/1996 | Griffth et al. | 712/23 |
| 5,530,825 A | 6/1996 | Black et al. | |
| 5,559,977 A | 9/1996 | Avnon et al. | |
| 5,598,546 A | 1/1997 | Blomgren | |
| 5,617,549 A | 4/1997 | DeLano | |
| 6,131,158 A | 10/2000 | Matsuo et al. | |
| 6,175,911 B1 * | 1/2001 | Oberman et al. | 712/221 |
| 6,330,657 B1 | 12/2001 | Col et al. | |
| 6,496,925 B1 * | 12/2002 | Rodgers et al. | 712/244 |

OTHER PUBLICATIONS

Zarka Cvetanovic and Dileep Bhandarkar, "Characterization of Alpha AXP Performance Using TP and Spec Workloads", 1994, Digital Equipment Corp., Boxborough, Mass., USA.

* cited by examiner

*Primary Examiner*—Alford Kindred
*Assistant Examiner*—Jesse Moll
(74) *Attorney, Agent, or Firm*—Erik M. Metzger

(57) ABSTRACT

Fusing a load micro-operation (uop) together with an arithmetic uop. Intra-instruction fusing can increase cache memory storage efficiency and computer instruction processing bandwidth within a microprocessor without incurring significant computer system cost. Uops are fused, stored in a cache memory, un-fused, executed in parallel, and retired in order to optimized cost and performance.

34 Claims, 6 Drawing Sheets

FUSING LOAD AND ALU OPERATIONS

FIELD

Embodiments of the invention relate to the field of instruction caching within a computer system. More particularly, embodiments of the invention relate to improving storage efficiency within a cache memory and increasing instruction throughput within a microprocessor without significantly increasing computer system cost.

BACKGROUND

Cache memory is used in computer systems in order to increase performance by alleviating the need for a processor to fetch instructions from main system memory sources, such as dynamic random-access memory (DRAM). DRAM and other main memory sources may require longer access times due to the paging and memory cell access speed of such memory sources, which can cause the processor to incur wait-states and degrade computer system performance.

Cache memory, on the other hand, provides the processor with a way to fetch instructions quickly without incurring the wait-states associated with main memory sources, such as DRAM. Using cache memory improves computer system performance by making commonly-used instructions available to the processor in a memory architecture that does not require paging cycles, that uses a relatively fast-access memory cell, and that places the cache memory in close proximity to the processor's local bus in order to reduce physical delay associated with bus structures.

Similarly, instruction caches can also be used in high-performance microprocessor to decrease the average instruction fetch latency. In order to further decrease fetch latency, instructions may be cached in decoded, or "micro-op" (uop), format. Advantageously, caching instructions in uop format can decrease instruction decode logic within the microprocessor, because only instructions fetched as a result of a cache miss need be decoded.

Typically, one uop is able to be stored in each cache memory entry, as illustrated in FIG. 1, thereby limiting the number of instructions that may be cached at once within a cache memory. Furthermore, some instructions contain more than one uop, resulting in more than one cache entry being used to store a single instruction.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention described herein pertain to increasing cache memory storage efficiency and computer instruction processing bandwidth within a microprocessor without incurring significant computer system cost. More particularly, embodiments of the invention relate to "fusing" together a load micro-operation (uop) and an arithmetic uop contained within a computer instruction and storing the fused uop within a single cache memory entry.

Figure 1:
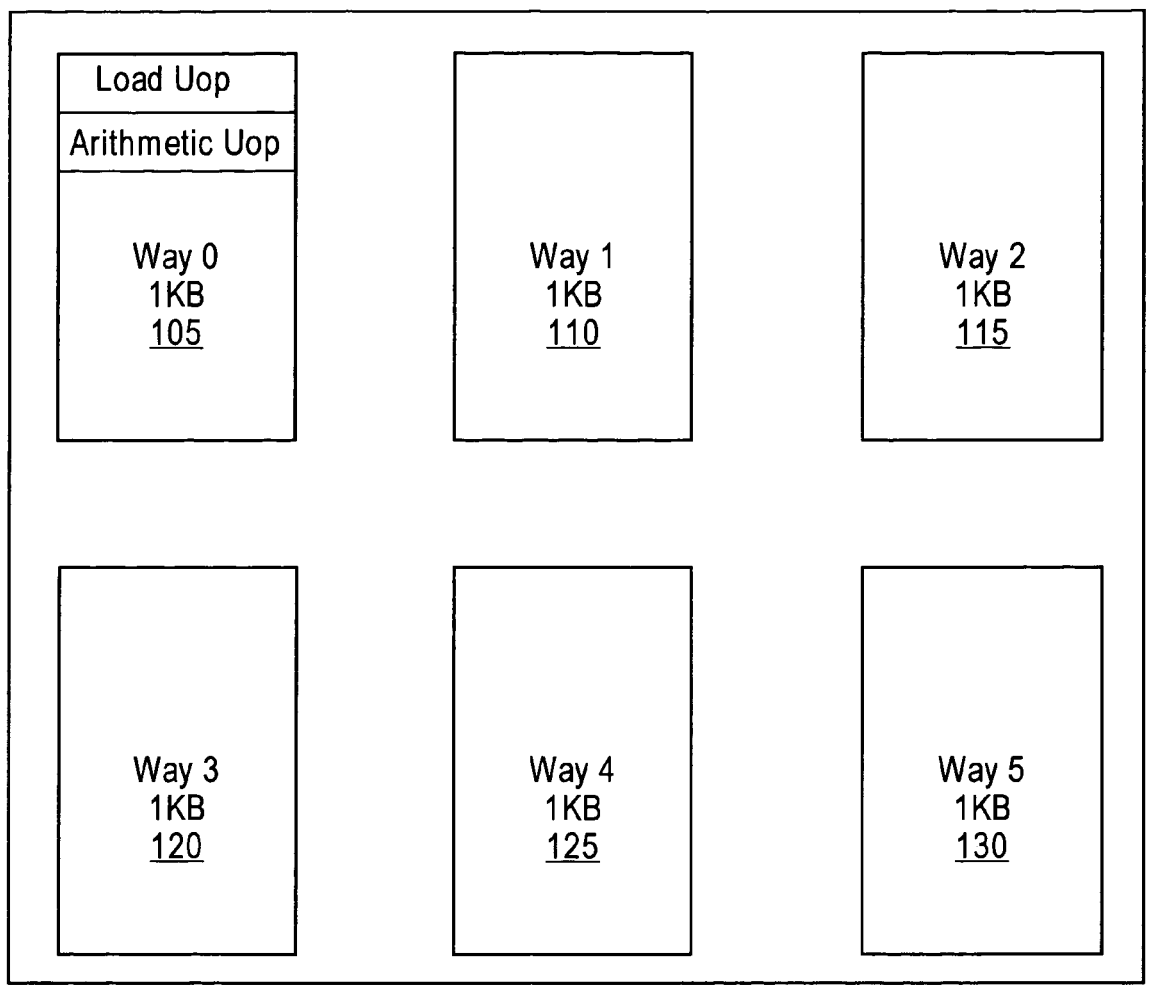
FIG. 1 illustrates a prior art instruction storage scheme within a cache memory.
Figure 2:
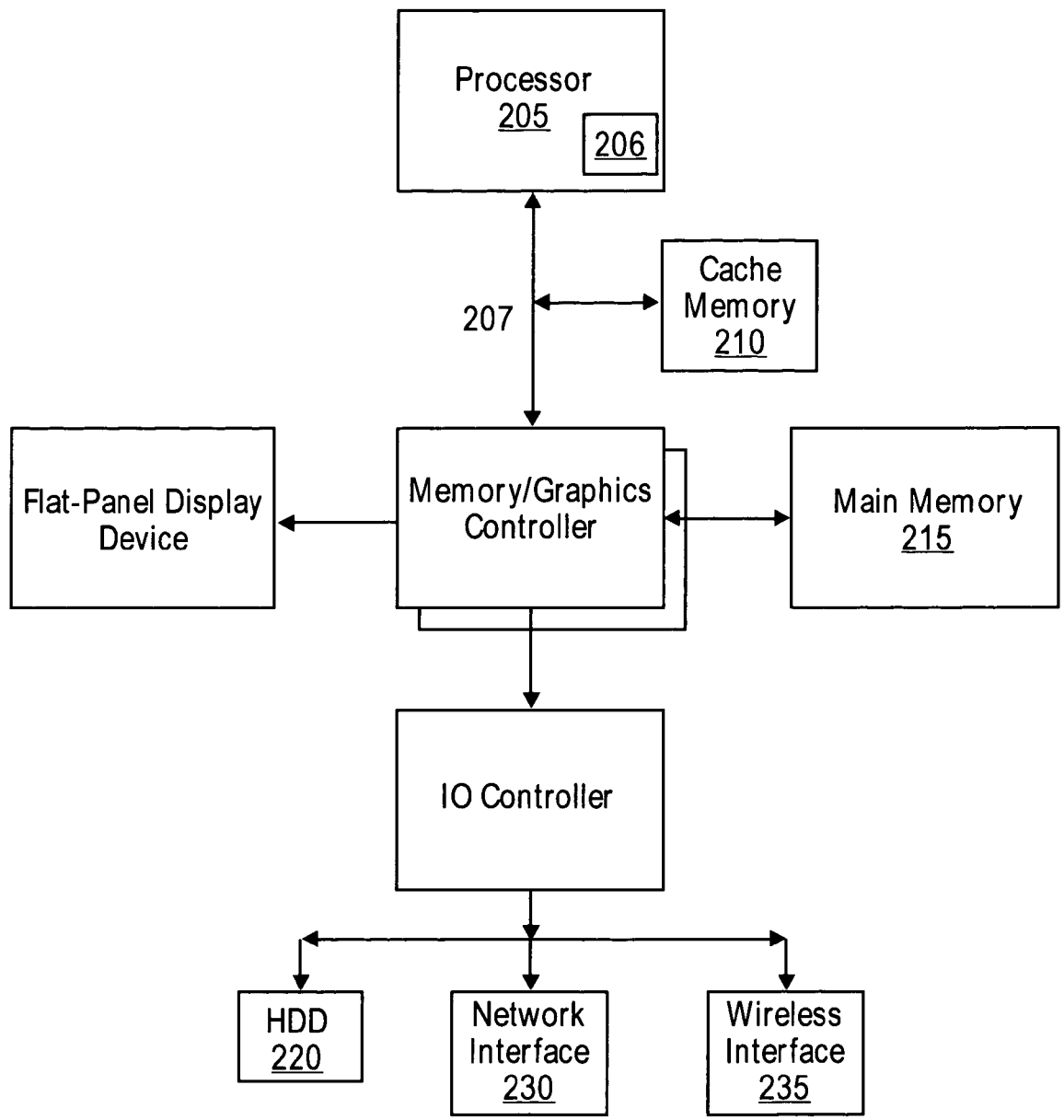
FIG. 2 illustrates a computer system that may be used in conjunction with one embodiment of the invention.

FIG. 2 illustrates a computer system that may be used in conjunction with one embodiment of the invention. A processor 205 accesses data from a cache memory 210 and main memory 215. Illustrated within the processor of FIG. 2 is the location of one embodiment of the invention 206. However, embodiments of the invention may be implemented within other devices within the system, as a separate bus agent, or distributed throughout the system. The main memory may be dynamic random-access memory (DRAM), a hard disk drive (HDD) 220, or a memory source 230 located remotely from the computer system containing various storage devices and technologies. The cache memory may be located either within the processor or in close proximity to the processor, such as on the processor's local bus 207. Furthermore, the cache memory may be composed of relatively fast memory cells, such as six-transistor (6T) cells, or other memory cells of approximately equal or faster access speed.

Figure 3:
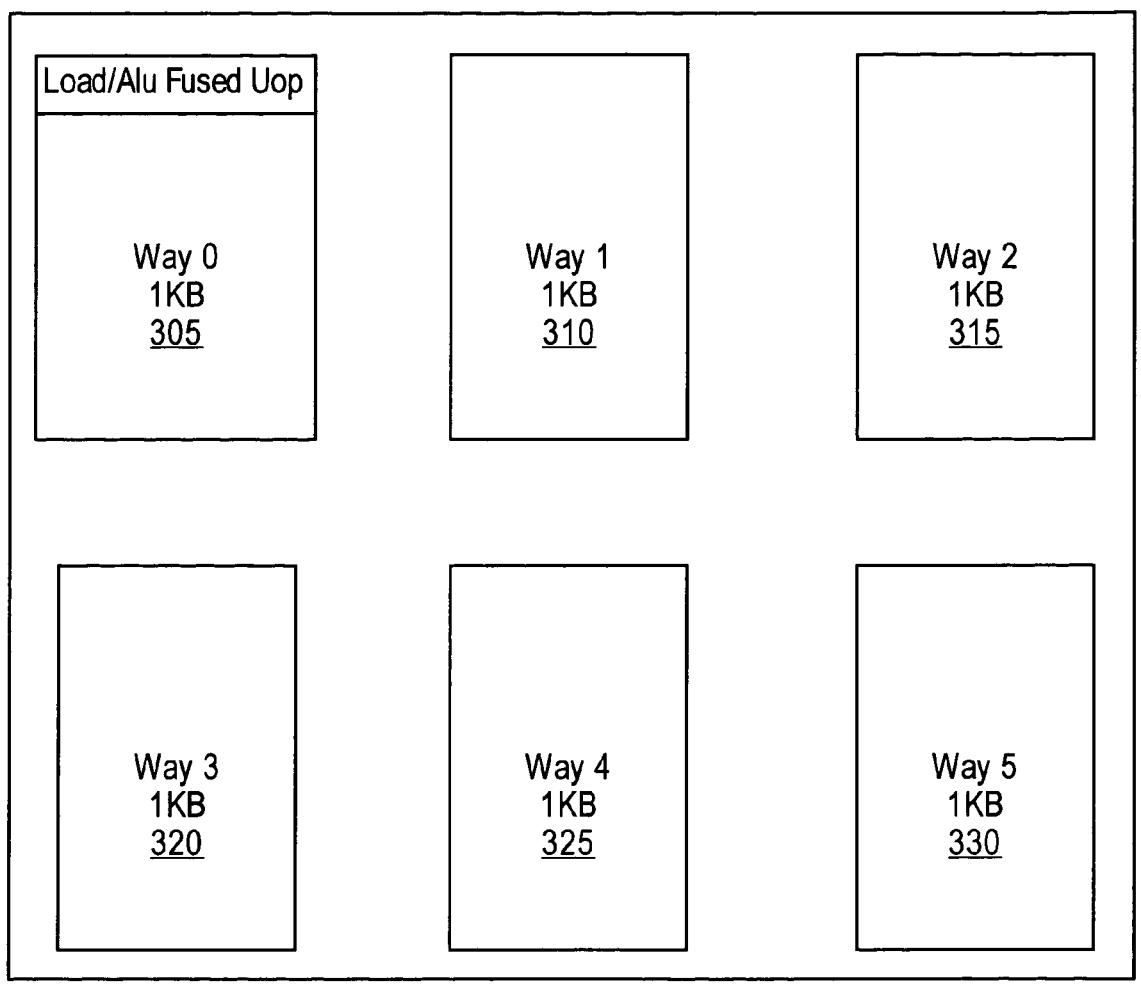
FIG. 3 illustrates a cache memory that may be used in conjunction with one embodiment of the invention.

FIG. 3 illustrates an example of a cache memory that may be used in conjunction with one embodiment of the invention. The cache memory 300 of FIG. 3 may store up to 6 KB of data, organized in 6 ways 305, 310, 315, 320, 325, and 330 of 1 KB each, in order to optimally meet the performance needs of a computer system, such as the one illustrated in FIG. 2. Each entry of the cache memory of FIG. 3 is able to store at least one micro-operation (uop) corresponding to an instruction. However, when used in conjunction with embodiments of the invention, the cache memory of FIG. 3 may be used to store a fused uop corresponding to a load uop and an arithmetic uop.

The cache memory of FIG. 3 is one example of a cache memory that may be used in conjunction with at least one embodiment of the invention. Larger cache memories may be used that more appropriately fit the performance needs of a particular microprocessor or computer system. For example, a 48 KB cache memory organized as 48 ways of 1 KB each may be used in conjunction with one embodiment of the invention. In this example, each cache entry traditionally stores only one uop for a total capacity of 4800 uops, assuming a typical uop size of 10 B. However, when used in conjunction with embodiments of the invention, the cache memory may store twice the number of uops in the same amount of storage space.

Uops typically do not vary in size, but the instruction to which they correspond often do depending on the instruction and the micro architecture for which the uop was designed. For example, a 32-bit microprocessor may have instructions containing 32 bits, whereas other instructions within the same instruction set may have only 16 bits, two of which may be included within the same 32-bit instruction.

Uops typically contain fields, such as an opcode, register, and immediate fields. The particular opcode(s) and number of registers and immediates supported by a particular uop vary, depending on the type of uop. Some instructions contain multiple uops, each performing a part of a complex instruction.

For example, one complex instruction that may be performed in conjunction with at least one embodiment the invention is the arithmetic/load instruction, add eax, [ebx] [ecx], which contains an arithmetic uop and a load uop. The instruction loads a value from the address indicated by [ebx+ ecx] and adds that value to the value currently stored in eax. Traditionally, the load and arithmetic uops are stored in separate cache entries, but embodiments of the invention enable them to be stored within the same cache entry.

The load/arithmetic instruction described above is an Intel® Architecture (IA) 32-bit instruction as specified by Intel Corporation of Santa Clara, Calif. However, other types of instructions in other instruction sets may be used in conjunction with embodiments of the invention, including instructions used in reduced instruction-set computing (RISC) processors.

An instruction residing in memory may be read into a cache memory residing either within the microprocessor or in close proximity to the microprocessor. Upon being stored within the cache memory, the instruction can be decoded into the separate uops of which it is composed. Traditionally the separate uops are stored within separate entries of the cache memory. However, embodiments of the invention enable the storage of intra-instruction uops into one cache entry.

Figure 4:
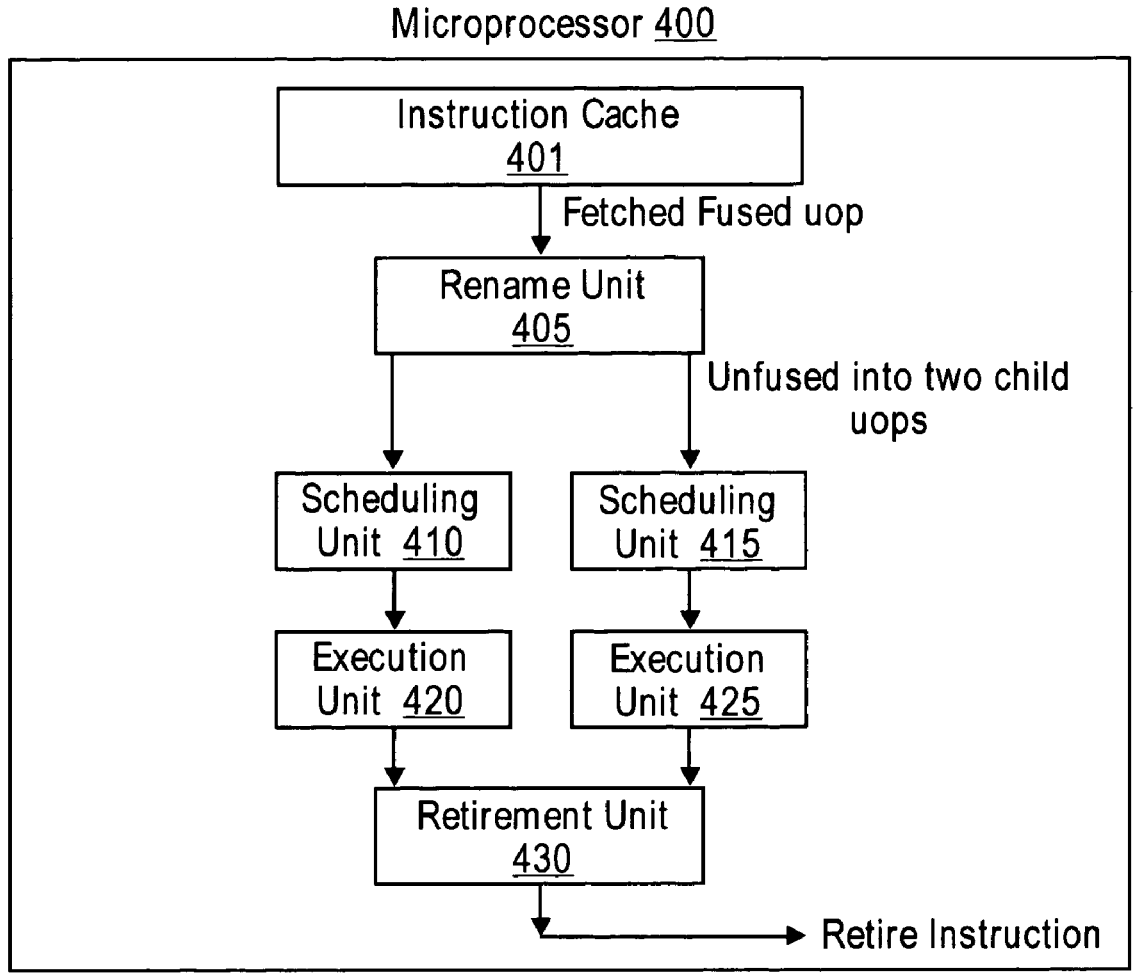
FIG. 4 illustrates a microprocessor architecture to support at least one embodiment of the invention.

FIG. 4 illustrates a microprocessor architecture that may be used in conjunction with at least one embodiment of the invention. An instruction read into the microprocessor from a main memory source, such as dynamic random-access memory (DRAM), is first decoded into separate uops. The separate uops are then encoded into a single uop by fusing together the separate uops so as to store both uops within in one entry of the instruction cache 401. The decoding and encoding may be implemented using standard complimentary metal-oxide semiconductor (CMOS) circuitry, software, or a combination thereof.

Once the fused uop is stored within the instruction cache, it can be fetched by the rename unit 405 where it is unfused into an arithmetic child uop and a load child uop. Each child uop is further processed by a different parallel scheduling unit 410 415 and execution unit 420 425. Each execution unit executes a child uop according to register dependencies within the child uop and scheduling algorithms implemented by the corresponding scheduling unit. The child uops are then stored in, or "collected" by, the retirement unit 430 until both uops have successfully executed and are ready for retirement.

Advantageously, embodiments of the invention may be implemented using a minimal number of hardware and or software modifications. In fact, there are three general rules that can be followed in order to implement at least one embodiment with minimal hardware or software modifications:

1. Only one of the child uops of a fused uop may generate an exception in order to limit the complexity of the retirement unit necessary to process fused uops.

2. Each child uop must be sent to a different scheduling unit in order to allow all child uops to be issued simultaneously to the scheduling units without requiring additional scheduling unit ports.

3. The child uops must utilize only the existing fields of the original instruction uop, such as the opcode field, registers, immediates, etc. This allows uops to be stored within the same entry of an instruction cache without incurring a die size increase.

In many cases, uop fields are identical between two uops within an instruction, and may therefore be combined relatively easily. However, in some instances, the opcode field and register fields may require special fusing/unfusing techniques in order to facilitate execution of the child uops.

In the case of an arithmetic/load instruction, for example, the opcode field of each child uop is encoded with information pertaining to both the arithmetic operation and the load operation. When the opcode is presented to a load execution unit, the information corresponding to the load operation is decoded, whereas when the field is presented to the arithmetic execution unit the arithmetic information is decoded. In order to extract the proper information, each execution unit of FIG. 4 uses decoding hardware, software, or a combination thereof, to recognize the operation information to which the execution unit corresponds. This allows the execution units to operate in parallel upon the respective opcode information to which they correspond.

Each uop or groups of uops typically use registers to store data in ways unique to the needs of the uop or uop group. Therefore, when the fused uop is unfused into separate child uops, the register assignment may be unique to the particular uop or uop pairs involved. In one embodiment, the rename unit manages the assignment of registers for unfused uops, using special register unfusing techniques, such as the one illustrated in FIG. 5.

Figure 5:
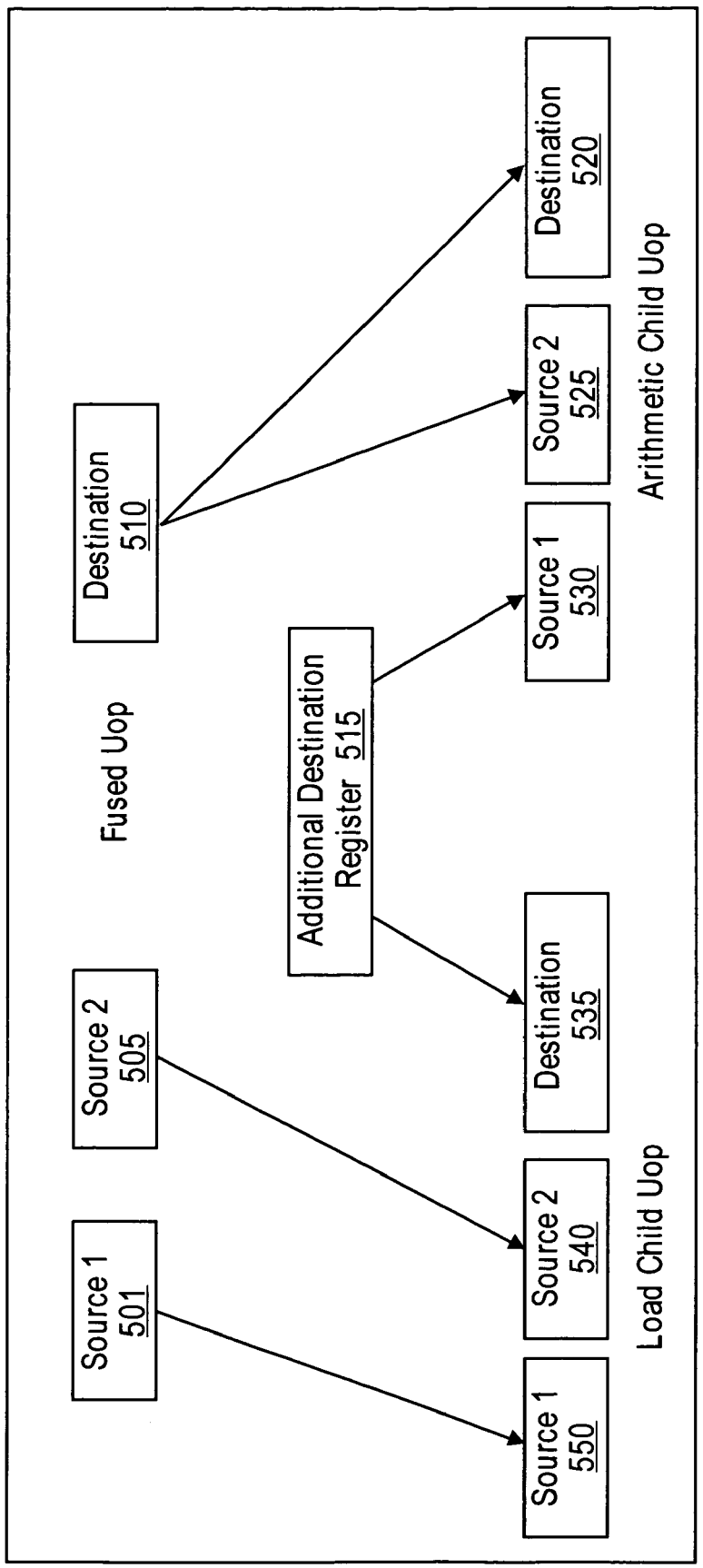
FIG. 5 illustrates a fused/unfused uop field assignment map for a Load/Arithmetic instruction according to one embodiment of the invention.

FIG. 5 illustrates a register assignment scheme according to one embodiment of the invention. A fused arithmetic/load uop typically has two source fields and one destination field, whereas the corresponding unfused child uops may each require two source fields and a destination field, respectively.

As illustrated in FIG. 5, both source fields 501 505 of the fused uop are assigned to the two source registers 550 540 of the load child uop. However, a new destination register 515 is assigned to relay the destination field 535 of the load child uop. The newly assigned destination register is not assigned to any logical register in the rename unit, but is used to forward the load child uop destination field to the first source register 530 of the arithmetic child uop. The destination field 510 of the fused uop is assigned both to the second source register 525 for the arithmetic child uop as well as to its destination register 520.

The result of the register unfusing technique illustrated in FIG. 5 is a load child uop which will generate an address containing two operands followed by an arithmetic child uop which will operate on the destination register containing the data produced by the load operation.

Figure 6:
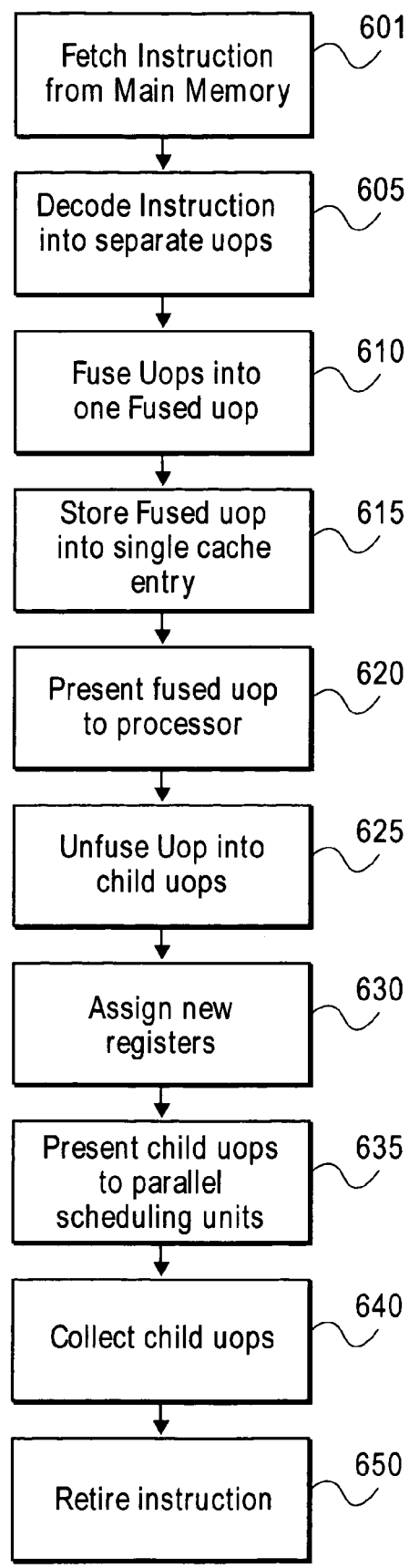
FIG. 6 is a flow chart illustrating how the invention may be used according to one embodiment.

FIG. 6 is a flow chart illustrating intra-instruction fusing/ unfusing of an arithmetic/load instruction, according to one embodiment. The instruction is fetched from main memory 601 and decoded into separate uops 605 before both are stored within a single cache entry 610. The separate uop fields (opcode, registers, immediates, etc.) each share a corresponding uop field within the fused uop cache entry 615. The uops are then retrieved from cache and presented to a microprocessor rename unit 620 where they are unfused into separate load and arithmetic child uops 625. As part of the unfusing process, the fused register fields are assigned to new registers 630 so that the uops may be scheduled and executed separately.

The load and arithmetic child uops are presented to different scheduling units 635 in parallel where they are prepared for execution 640 by two separate parallel execution units. The execution units decode opcode information from a common opcode field corresponding to each child uop. The information pertaining to the particular child uop that an execution is operating upon is interpreted by the execution unit and the information pertaining to the other child uop is ignored.

Finally, once both child uops have executed, they are collected by the retire unit, which then retires the instruction 650.

Embodiments of the invention may include various implementations, including circuits (hardware) using complementary metal-oxide-semiconductor (CMOS) technology, machine-readable media with instructions (software) to perform embodiments of the invention when executed by a machine, such as a processor, or a combination of hardware and software.

The invention has been described herein by way of example without limiting the invention to any particular embodiment. Furthermore, embodiments of the invention facilitate numerous ways in which to take advantage of higher density instruction storage and is not limited to the advantages described herein.

For example, in addition to allowing for higher density instruction storage in cache memory without incurring additional cache capacity or significant die cost, embodiments of the invention enable increased fetch and rename throughput by operating on multiple uops at a time. In a processor with a fetch/rename throughput of uops per cycle, the same processor may increase the fetch/rename throughput to 8 uops per cycle using embodiments of the invention. Furthermore, since each fused uop only requires one entry in the retirement unit, the maximum number of unfused uops in the processor at any time as well as the retirement throughout may increase accordingly.

In the forgoing specification the invention has been described with reference to specific exemplary embodiments. It will, however, be evident that various modifications and changes may be made thereto without departing from the broader spirit and scope of the invention. The specification and drawings are, according, to be regarded in an illustration rather than a restrictive sense.

What is claimed is:

1. A method comprising:
fetching an instruction from a main memory source;
decoding said instruction into at least two micro-operations (uops), said at least two uops corresponding to a load operation and an arithmetic operation, respectively;
fusing said at least two uops into one fused uop;
storing said fused uop within one cache entry within a cache memory;
introducing said fused uop to a microprocessor.

2. The method of claim 1 further comprising decoding said fused uops into a load child uop and an arithmetic child uop.

3. The method of claim 2 wherein said decoding comprises assigning two fused uop source fields to a first and second load child uop source register.

4. The method of claim 3 wherein said decoding further comprises assigning a fused uop destination field to a first arithmetic child uop source register and an arithmetic child uop destination register.

5. The method of claim 4 wherein said decoding further comprises forwarding a load child uop destination field to a second arithmetic child uop source register.

6. The method of claim 2 further comprising executing said at least two child uops in parallel, said executing comprising executing a fused opcode within at least two parallel execution units, each of said at least two parallel execution units being able to interpret information within said fused opcode corresponding to either said load child uop or said arithmetic child uop.

7. The method of claim 6 further comprising collecting said load child uop and said arithmetic child uop for retirement.

8. The method of claim 7 further comprising retiring said instruction after said load child uop and said arithmetic child uop are collected.

9. An apparatus comprising:
a rename unit comprising logic to decode a fused micro-operation (uop) into a load child uop and an arithmetic child uop;
at least two parallel scheduling units coupled to said rename unit;
at least two parallel execution units coupled to said at least two parallel scheduling units;
a retirement unit coupled to said at least two parallel execution units logic to reassign fused uop register fields including logic to assign two fused uor source fields to a first and second load child uop source registers.

10. The apparatus of claim 9 wherein one of said at least two parallel scheduling units is able to schedule said load child uop in parallel with a second of said at least two parallel scheduling units scheduling said arithmetic child uop.

11. The apparatus of claim 10 wherein one of said at least two parallel execution units is able to execute said load child uop in parallel with a second of said at least two parallel execution units executing said arithmetic child uop.

12. The apparatus of claim 11 wherein said retirement unit is able to retire said load child uop and said arithmetic child uop after they are executed.

13. The apparatus of claim 9 wherein one of said at least two parallel execution units is able to execute a first opcode corresponding to said load child uop and a second of said at least two parallel execution units is able to execute a second opcode corresponding to said arithmetic child uop, said first opcode and said second opcode being encoded into a fused opcode.

14. The apparatus of claim 13 wherein said logic to reassign fused uop register fields comprises logic to assign a fused uop destination field to a first arithmetic child uop source register and an arithmetic child uop destination register.

15. The apparatus of claim 14 wherein said logic to reassign fused uop register fields comprises logic to forward a load child uop destination field to a second arithmetic child uop source register.

16. The apparatus of claim 9 further comprising a cache memory coupled to said rename unit, said cache memory comprising entries to store a fused uop.

17. A system comprising:
a microprocessor to execute an instruction, said instruction comprising a load micro-operation (uop) and an arithmetic uop, said microprocessor to encode said load uop and arithmetic uop into a fused uop; and
a cache memory coupled to said encoding unit to store said fused uop in one entry of said cache memory logic coupled to the microprocessor to assign two fused uop source fields to a first and second load child uop source registers.

18. The system of claim 17 wherein said microprocessor comprises a rename unit, said rename unit being able to decode said fused uop into a load child uop and an arithmetic child uop.

19. The system of claim 18 wherein said microprocessor comprises a plurality of parallel scheduling units to schedule for execution said load child uop and said arithmetic child uop in parallel.

20. The system of claim 19 wherein said microprocessor comprises a plurality of execution units to execute said load child uop and said arithmetic child uop in parallel, said plurality of execution units being able to decode a fused opcode comprising an opcode corresponding to said load child uop and an opcode corresponding to said arithmetic child uop.

21. The system of claim 20 wherein said microprocessor comprises a retirement unit to collect said load child uop and said arithmetic child uop and retire said instruction.

22. The system of claim 17 wherein only one of said load child uop and said arithmetic child uop may generate an exception within said microprocessor.

23. The system of claim 22 wherein each of said load child uop and said arithmetic child uop are scheduled by a different scheduling unit.

24. The system of claim 23 wherein said load child uop and said arithmetic child uop use uop fields of said load uop and said arithmetic uop, respectively.

25. A machine-readable medium having stored thereon a set of instructions, which when executed by a machine, cause said machine to perform a method comprising:
   decoding an instruction into at least two micro-operations (uops);
   fusing said at least two uops into one fused uop;
   storing said fused uop within one cache entry within a cache memory;
   introducing said fused uop to a microprocessor;
   decoding said fused uops into a load child uop and an arithmetic child uop, said decoding comprising assigning two fused uop source fields to a first and second load child uop source registers and assigning a fused uop destination field to a first arithmetic child uop source register and an arithmetic child uop destination register and forwarding a load child uop destination field to a second arithmetic child uop source register.

26. The machine-readable medium of claim 25 further comprising executing said load child uop and said arithmetic child uop in parallel, said executing comprising introducing a fused opcode to at least two parallel execution units, each of said at least two parallel execution units being able to execute one opcode in said fused opcode corresponding to one of said load child uop and arithmetic child uop.

27. The machine-readable medium of claim 26 further comprising collecting said load child uop and said arithmetic child uop.

28. The machine-readable medium of claim 27 further comprising retiring said instruction after said load child uop and said arithmetic child uop are collected.

29. An apparatus comprising:
   a means for renaming comprising a means for decoding a fused micro-operation (uop) into a load child uop and an arithmetic child uop;
   a means for scheduling said load child uop and said arithmetic child uop in parallel coupled to said means for renaming;
   a means for executing said load child uop and said arithmetic child uop in parallel coupled to said means for scheduling;
   a means for retiring coupled to said means for executing a means for assigning two fused uor source fields to a first and second load child uor source registers.

30. The apparatus of claim 29 wherein said means for retiring is able to retire said load child uop and said arithmetic child uop after they are executed.

31. The apparatus of claim 29 wherein one of said means for execution is able to execute a first opcode corresponding to said load child unit and a second opcode corresponding to said arithmetic child uop, said first opcode and said second opcode being encoded into a fused opcode.

32. The apparatus of claim 31 wherein said means for assigning two fused uop source fields comprises a means for reassigning a fused uop destination field to a first arithmetic child uop source register and an arithmetic child uop destination register.

33. The apparatus of claim 32 wherein said means for assigning two fused uop source fields comprises a means for forwarding a load child uop destination field to a second arithmetic child uop source register.

34. The apparatus of claim 29 further comprising a cache memory coupled to said means for renaming, said cache memory comprising entries to store a fused uop.

* * * * *